(12) United States Patent
Moore

(10) Patent No.: US 7,857,111 B1
(45) Date of Patent: Dec. 28, 2010

(54) REINFORCED DISC BRAKE ROTOR

(75) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 0 days.

(21) Appl. No.: 12/860,927

(22) Filed: Aug. 22, 2010

(51) Int. Cl.
 *F16D 65/12* (2006.01)
(52) U.S. Cl. .............................. 188/218 XL; 188/264 A
(58) Field of Classification Search ................... 188/17, 188/18 A, 218 XL, 264 A, 264 AA
See application file for complete search history.

(56) References Cited

U.S. PATENT DOCUMENTS

2008/0060891 A1* 3/2008 Chen et al. ............ 188/218 XL
2008/0264741 A1* 10/2008 Fujita et al. ................ 188/18 A
2008/0314703 A1* 12/2008 Gherardi et al. ........ 188/218 XL
2010/0133054 A1* 6/2010 Wagner ................ 188/218 XL

* cited by examiner

*Primary Examiner*—Christopher P Schwartz

(57) ABSTRACT

A reinforced disc brake rotor includes a disc rotor which has a connecting portion formed in a center thereof for adapting to be securely connected with a wheel hub. A friction portion is annularly formed on an outer edge of the disc rotor for adapting to be clamped by brake lining pads. A supporting portion is annularly formed on the disc rotor and located between the connecting portion and the friction portion. The supporting portion has a plurality of vent spaces defined therein and extending therethrough. A carbon fiber layer is laminated along an edge of each vent space in the supporting portion for reinforcing the disc rotor and reducing a weight of the disc rotor.

5 Claims, 3 Drawing Sheets

REINFORCED DISC BRAKE ROTOR

BACKGROUND OF THE INVENTION

1. Field of the Invention

The present invention relates to a reinforced disc brake rotor and more particularly to a disc rotor having a plurality of vent spaces which are respectively laminated by carbon fiber layers for reinforcing the disc rotor.

2. Description of Related Art

Cycling is a popular leisure activity. Most people would ride a bike with family or friends in the weekends. Therefore, each cyclist should be aware of the bike riding safety. The bicycle brake system plays an important role in the bicycle riding safety. And the disc brake rotor is one of major elements in the brake system.

A conventional disc brake rotor is integrally formed by metal. The disc rotor has a plurality of through holes defined therein for reducing a weight of the disc rotor. The disc rotor has a plurality of apertures radially defined therein and located in a center portion thereof. A plurality of screws correspondingly passes through the apertures of the disc rotor for connecting the disc rotor with a wheel hub of a bicycle, such that the disc rotor is able to be driven to rotate with the wheel hub. When braking, a brake caliper would clamp two sides of the disc rotor to stop a rotation of the disc rotor.

The metal-made disc rotor has the through holes to eliminate heat which is produced by a friction of the brake caliper and the disc rotor during braking. However, the structure strength of the disc rotor is weakened due to the through holes in the disc rotor.

The present invention has arisen to mitigate and/or obviate the disadvantages of the conventional disc brake rotor.

SUMMARY OF THE INVENTION

The main objective of the present invention is to provide an improved reinforced disc brake rotor.

To achieve the objective, a reinforced disc brake rotor has a disc rotor. The disc rotor has a connecting portion formed in a center thereof. The connecting portion has a connecting hole centrally defined therein and extending therethrough for adapting to sleeve on a wheel hub. The connecting portion has a plurality of fastening bores radially defined therein and spacedly located around the connecting hole, such that the wheel hub is able to be fastened through the fastening bores. The connecting portion has a plurality of ribs spacedly formed on an inner periphery of the connecting hole for adapting to position the wheel hub.

A friction portion is annularly formed on an outer edge of the disc rotor for adapting to be clamped by brake lining pads. A supporting portion is annularly formed on the disc rotor and located between the connecting portion and the friction portion. The supporting portion has a plurality of vent spaces defined therein and extending therethrough. The supporting portion has a plurality of laminated portions disposed thereon and respectively located around the vent spaces. Each laminated portion has a margin section disposed around an edge of the corresponding vent space. Each laminated portion has a flange circumferentially extending from an inner periphery of the corresponding vent space and positioned adjacent to the corresponding margin section, wherein the flange has a thickness relatively thinner than a thickness of the adjacent margin section and a depth of the corresponding vent space. The margin section and the flange are formed into a stepped configuration.

A carbon fiber layer is enclosedly laminated along each laminated portion of the supporting portion for reinforcing the disc rotor. The carbon fiber layer includes a protruding region covered on the margin section of each laminated portion and an indent region covered on the flange of each laminated portion, such that the protruding region and the adjacent indent region of the carbon fiber layer are correspondingly formed into a stepped configuration.

Accordingly, the disc rotor with the vent spaces provides light-weighting and heat-eliminating effects. The carbon fiber layers are light-weighted. The carbon fiber layer covering on each laminated portion of the supporting portion is able to reinforce the supporting portion of the disc rotor.

Further benefits and advantages of the present invention will become apparent after a careful reading of the detailed description with appropriate reference to the accompanying drawings.

DETAILED DESCRIPTION OF THE INVENTION

Figure 1:
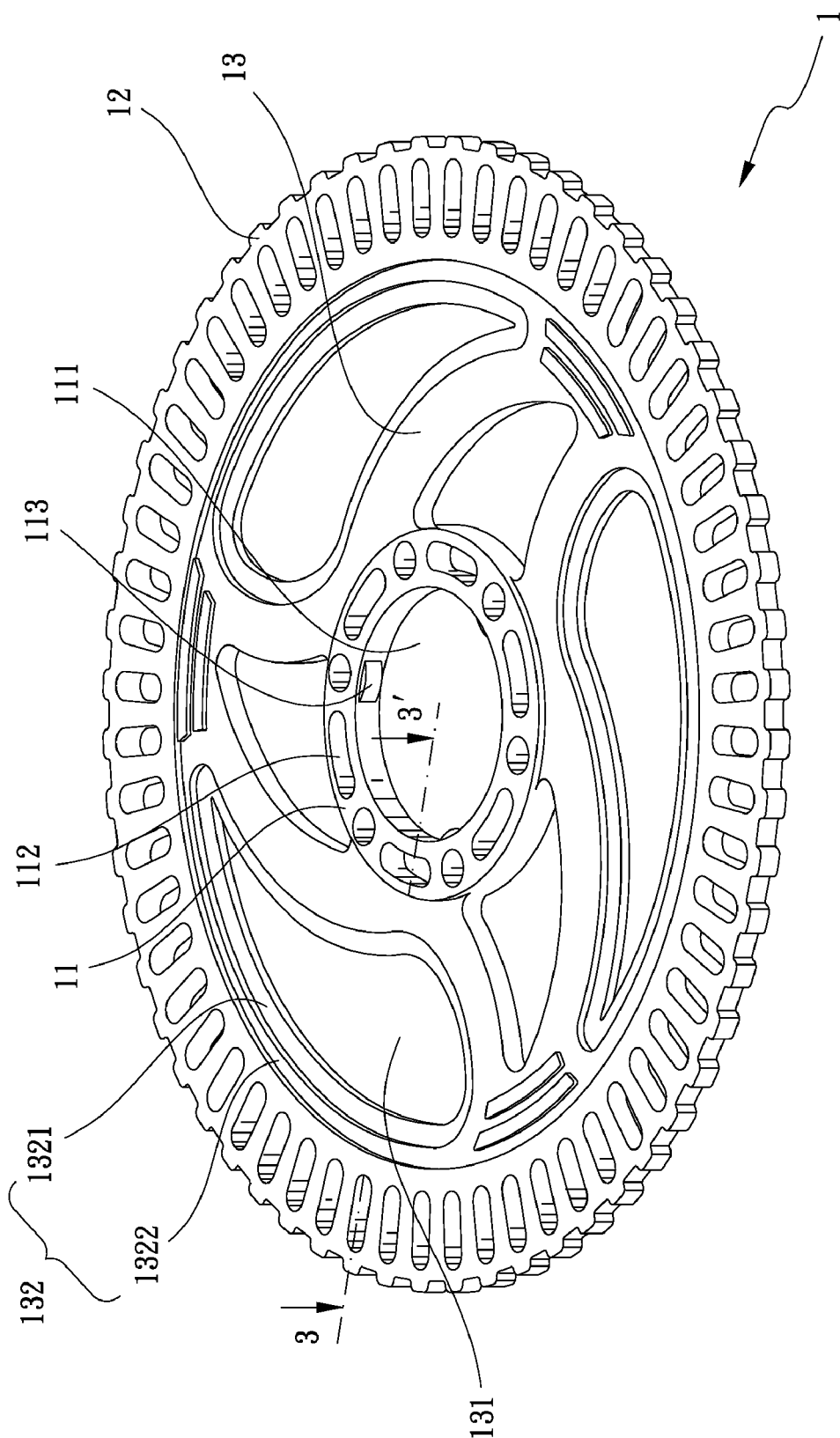
FIG. 1 is a perspective view of a disc rotor of a reinforced disc brake rotor in accordance with the present invention.
Figure 2:
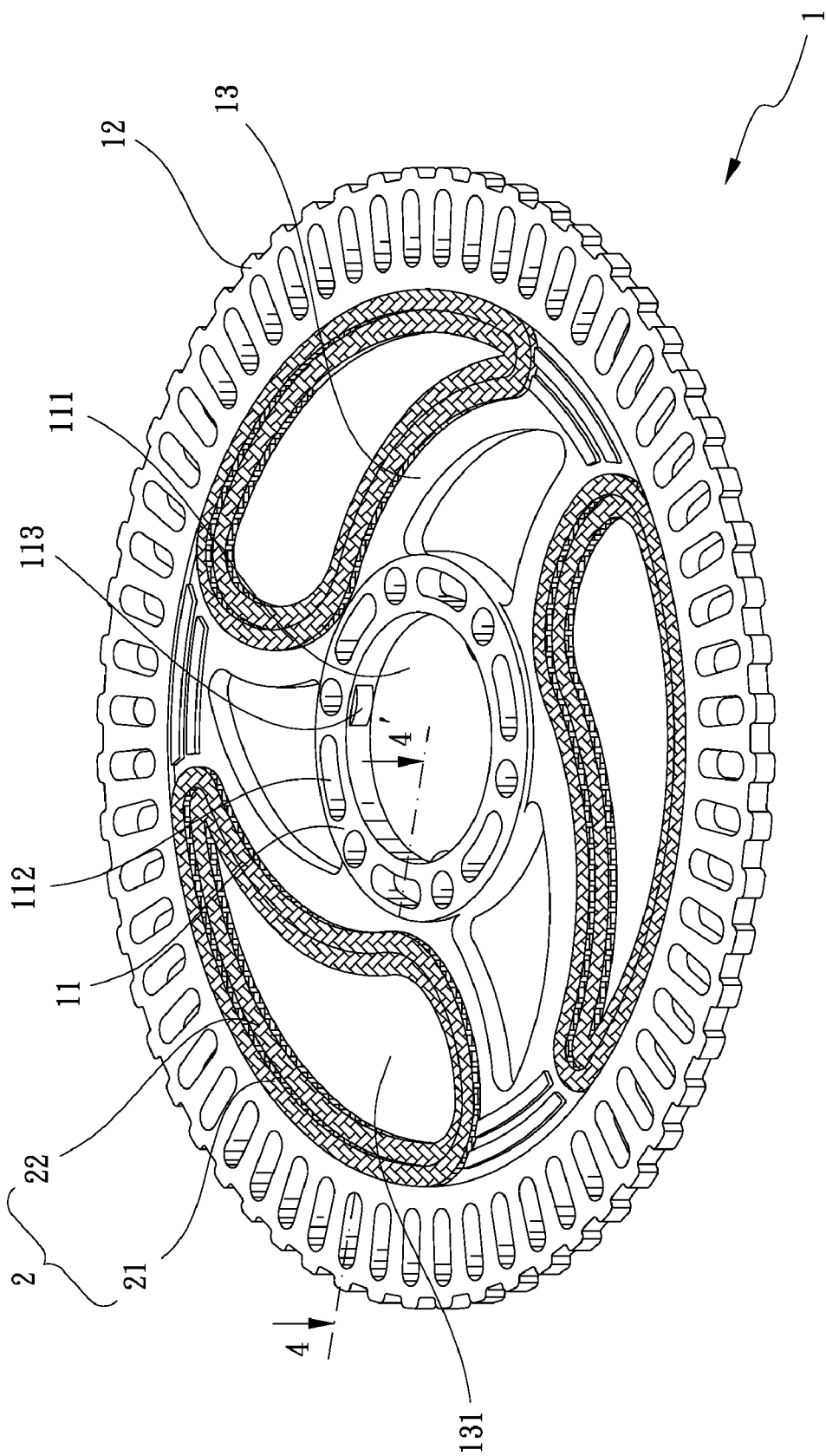
FIG. 2 is a perspective view of the reinforced disc brake rotor in accordance with the present invention.
Figure 3:
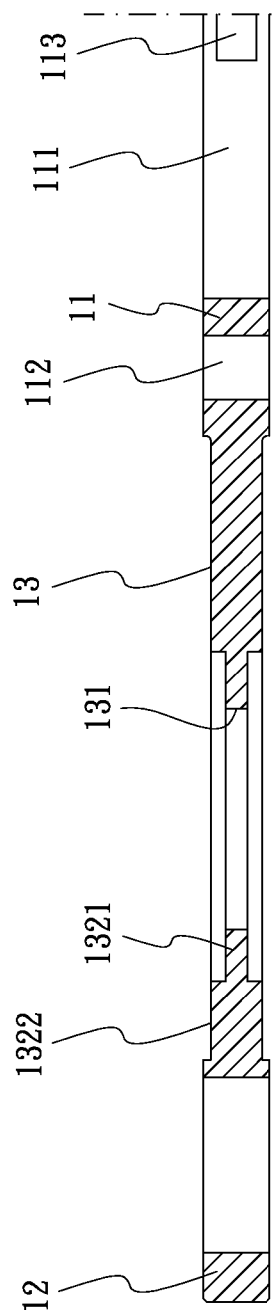
FIG. 3 is a partially cross-sectional view of the disc rotor of the reinforced disc brake rotor in accordance with the present invention taken along line 3-3' in FIG. 1.
Figure 4:
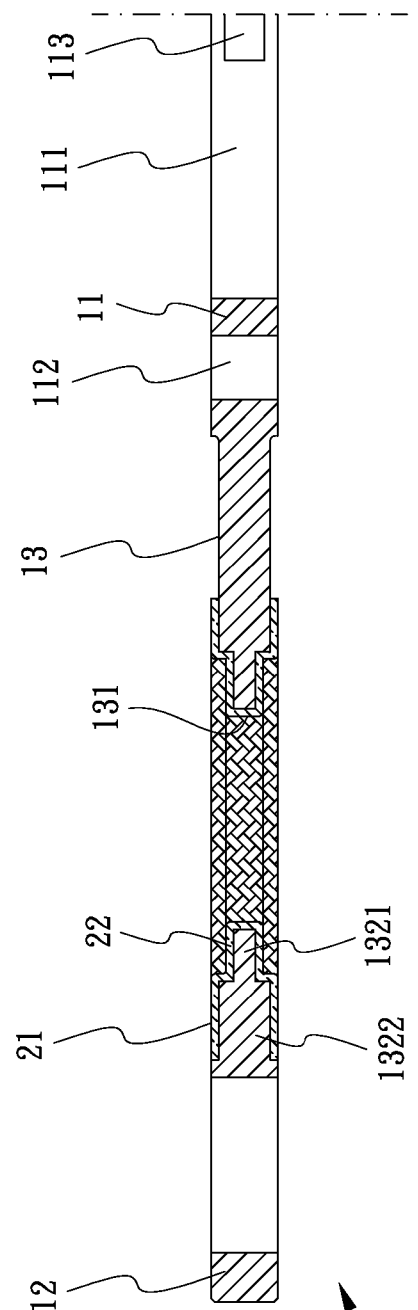
FIG. 4 is a partially cross-sectional view of the reinforced disc brake rotor in accordance with the present invention taken along line 4-4' in FIG. 2.

Referring to the drawings to FIGS. 1-4, a reinforced disc brake rotor in accordance with the present invention comprises a disc rotor 1 which is assembled with a bicycle or a motorcycle (not shown). The disc rotor 1 has a connecting portion 11 formed in a center thereof. The connecting portion 11 has a connecting hole 111 centrally defined therein and extending therethrough for coaxially sleeving on a wheel hub (not shown). The connecting portion 11 has a plurality of fastening bores 112 radially defined therein and extending therethrough. The fastening bores 112 are spacedly located around the connecting hole 111. The fastening bores 112 are provided for fastening the wheel hub in place by fasteners (not shown). The connecting portion 11 has a plurality of ribs 113 spacedly formed in and extending from an inner periphery of the connecting hole 111 for positioning the wheel hub. Accordingly, the wheel hub is securely connected with the connecting portion 11 of the disc rotor 1, and the wheel hub rotates simultaneously with the disc rotor 1.

A friction portion 12 is annularly formed on an outer edge of the disc rotor 1 for being clamped by two brake lining pads (not shown).

A supporting portion 13 is annularly formed on the disc rotor 1 and located between the connecting portion 11 and the friction portion 12. The supporting portion 13 has a plurality of vent spaces 131 defined therein and extending therethrough for providing a ventilating effect. The supporting portion 13 has a plurality of laminated portions 132 disposed thereon and respectively located around the vent spaces 131. Each laminated portion 132 is disposed from one side to an opposite side of the supporting portion 13 through the corresponding vent space 131. Each laminated portion 132 has a margin section 1322 disposed around an edge of the corresponding vent space 131. Each laminated portion 132 has a flange 1321 circumferentially formed on and extending from an inner periphery of the corresponding vent space 131 and positioned adjacent to the corresponding margin section 1322. The flange 1321 has a thickness relatively thinner than a thickness of the adjacent margin section 1322 and a depth of the corresponding vent space 131. The flange 1321 and the adjacent margin section 1322 of each laminated portion 132 are formed into a stepped configuration.

A carbon fiber layer 2 is enclosedly laminated along each laminated portion 132 of the supporting portion 13 for reinforcing the disc rotor 1. The carbon fiber layer 2 has a protruding region 21 which is covered on the margin section 1322 of each laminated portion 132 and protruded from a surface of each side of the supporting portion 13. The carbon fiber layer 2 has an indent region 22 which is covered on the flange 1321 of each laminated portion 132. As the carbon fiber layer 2 is correspondingly laminated on each laminated portion 132, the flange 1321 with the carbon fiber layer 2 of the indent region 22 has a thickness relatively thinner than a depth of the corresponding vent space 131 with the carbon fiber layer 2 of the protruding region 21, such that the protruding region 21 and the adjacent indent region 22 of each carbon fiber layer 2 are correspondingly formed into a stepped configuration.

Accordingly, the stepped configuration formed by each laminated portion 132 provides a firm lamination between the carbon fiber layer 2 and the disc rotor 1. The disc rotor 1 with the vent spaces 131 provides light-weighting and heat-eliminating effects. The carbon fiber layers 2 are light-weighted. The carbon fiber layer 2 covering on each laminated portion 132 of the supporting portion 13 is able to reinforce the supporting portion 13 of the disc rotor 1. When the two brake lining pads tightly clamp the friction portion 12 of the disc rotor 1 for braking, heat produced by a friction between the brake lining pads and the friction portion 12 would be easily eliminated due to the vent spaces 131 of the supporting portion 13.

Although the invention has been explained in relation to its preferred embodiment, it is to be understood that many other possible modifications and variations can be made without departing from the spirit and scope of the invention as hereinafter claimed.

What is claimed is:

1. A reinforced disc brake rotor comprising:
    a disc rotor having a connecting portion formed in a center thereof for adapting to be securely connected with a wheel hub, a friction portion annularly formed on an outer edge of the disc rotor for adapting to be clamped by brake lining pads, a supporting portion annularly formed on the disc rotor and located between the connecting portion and the friction portion, the supporting portion having a plurality of vent spaces defined therein and extending therethrough; and
    a carbon fiber layer laminated along an edge of each vent space in the supporting portion for reinforcing the disc rotor and reducing a weight of the disc rotor.

2. The reinforced disc brake rotor as claimed in claim 1, wherein the supporting portion has a plurality of laminated portions disposed thereon and respectively located around the vent spaces, the carbon fiber layer enclosedly covered on each laminated portion;
    each laminated portion having a margin section disposed around an edge of the corresponding vent space and a flange circumferentially extending from an inner periphery of the corresponding vent space and positioned adjacent to the corresponding margin section, wherein the flange has a thickness relatively thinner than a thickness of the adjacent margin section and a depth of the corresponding vent space, such that the flange and the adjacent margin section are formed into a stepped configuration.

3. The reinforced disc brake rotor as claimed in claim 2, wherein the carbon fiber layer includes a protruding region covered on the margin section of each laminated portion and an indent region covered on the flange of each laminated portion, such that the protruding region and the adjacent indent region of the carbon fiber layer are correspondingly formed into a stepped configuration.

4. The reinforced disc brake rotor as claimed in claim 1, wherein the connecting portion has a connecting hole centrally defined therein and extending therethrough, the connecting portion having a plurality of fastening bores defined therein and spacedly located around the connecting hole, such that the connecting hole adapts to sleeve on the wheel hub and the connecting portion adapts to be securely connected with the wheel hub.

5. The reinforced disc brake rotor as claimed in claim 4, wherein the connecting portion has a plurality of ribs spacedly formed on an inner periphery of the connecting hole for adapting to position the wheel hub.

\* \* \* \* \*